US010075392B1

(12) United States Patent
Chritz et al.

(10) Patent No.: US 10,075,392 B1
(45) Date of Patent: Sep. 11, 2018

(54) METHODS AND APPARATUSES FOR PROCESSING MULTIPLE COMMUNICATIONS SIGNALS WITH A SINGLE INTEGRATED CIRCUIT CHIP

(71) Applicant: MICRON TECHNOLOGY, INC., Boise, ID (US)

(72) Inventors: Jeremy Chritz, Seattle, WA (US); Tamara Schmitz, Scotts Valley, CA (US); John L. Watson, Edgewood, WA (US); John Schroeter, Bainbridge Island, WA (US); Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/447,867

(22) Filed: Mar. 2, 2017

(51) Int. Cl.
| H04W 4/00 | (2018.01) |
| H04L 12/933 | (2013.01) |
| H04B 7/04 | (2017.01) |
| H04W 4/80 | (2018.01) |
| H04W 84/04 | (2009.01) |

(52) U.S. Cl.
CPC ............ *H04L 49/109* (2013.01); *H04B 7/04* (2013.01); *H04W 4/008* (2013.01); *H04W 4/80* (2018.02); *H04W 84/042* (2013.01)

(58) Field of Classification Search
USPC .......................... 455/41.4, 78; 340/506, 10.1
See application file for complete search history.

(56) References Cited

U.S. PATENT DOCUMENTS

| 7,606,530 B1 | 10/2009 | Anderson et al. |
| 7,948,371 B2* | 5/2011 | Muirhead ........... B29C 47/0019 |
| | | 340/506 |
| 2003/0120745 A1* | 6/2003 | Katagishi ................ H04L 29/06 |
| | | 709/217 |
| 2005/0113035 A1 | 5/2005 | Kyongyop |
| 2006/0268777 A1 | 11/2006 | Schmidt |
| 2007/0030124 A1* | 2/2007 | Lee ........................ H04B 1/006 |
| | | 340/10.1 |
| 2009/0221232 A1* | 9/2009 | Estevez ................. H04W 88/06 |
| | | 455/41.1 |

(Continued)

FOREIGN PATENT DOCUMENTS

| JP | 2010037104 A | 2/2010 |
| KR | 20060036434 A | 4/2006 |
| WO | 2012162172 A1 | 11/2012 |

OTHER PUBLICATIONS

U.S. Appl. No. 15/447,893 entitled "Methods and Apparatuses for Determining Real-Time Location Information of RFID Devices", filed Mar. 2, 2017, pp. all.

(Continued)

*Primary Examiner* — David Q Nguyen
(74) *Attorney, Agent, or Firm* — Dorsey & Whitney LLP (57) ABSTRACT

An apparatus is disclosed. The apparatus comprises a plurality of antennas and an integrated circuit chip coupled to the plurality of antennas, and is configured to process cellular signals received from the plurality of antennas in accordance with a cellular communication protocol and to process radio frequency identification (RFID) signals received from the plurality of antennas in accordance with an RFID protocol.

18 Claims, 6 Drawing Sheets

(56) References Cited

U.S. PATENT DOCUMENTS

| | | |
|---|---|---|
| 2013/0051284 A1 | 2/2013 | Khlat |
| 2014/0306808 A1 | 10/2014 | Jones et al. |
| 2014/0361077 A1 | 12/2014 | Davidson |
| 2015/0304000 A1* | 10/2015 | Wloczysiak ........... H04B 1/006 |
| | | 455/78 |
| 2016/0072731 A1 | 3/2016 | Martin et al. |
| 2016/0227598 A1* | 8/2016 | Singh .................. H04W 76/027 |

OTHER PUBLICATIONS

International Search Report and Written Opinion received for PCT Application No. PCT/US2018/018807 dated May 30, 2018, pp. all.

* cited by examiner

METHODS AND APPARATUSES FOR PROCESSING MULTIPLE COMMUNICATIONS SIGNALS WITH A SINGLE INTEGRATED CIRCUIT CHIP

BACKGROUND

Digital signal processing for wireless communications, such as digital baseband processing or digital front-end implementations, can be implemented using some hardware (e.g. silicon) computing platforms. For example, multimedia processing and digital radio frequency (RF) processing may be accomplished in a digital front-end implementation of a wireless transceiver, as implemented by an application-specific integrated circuit (ASIC). A variety of hardware platforms can implement such digital signal processing, such as the ASIC, a digital signal processor (DSP) implemented as part of a field-programmable gate array (FPGA), or a system-on-chip (SoC). However, each of these solutions often requires implementing customized signal processing methods that are hardware implementation specific. For example, a digital signal processor can implement a turbocoding application for data in a customized design of an FPGA.

Many traditional digital signal processing systems implement a dual-chip solution in which a network on chip is implemented on one integrated circuit chip and coupled to an antenna tuned for a particular frequency range. The network on chip is coupled to a host chip on a separate integrated circuit chip over a communications bus (e.g., a Peripheral Component Interconnect Express bus). However, such systems are physically larger and draw substantial power, which limits their applicability to wireless and/or mobile applications, such as smartphones, tablets, and laptop computers.

Moreover, there is interest in moving wireless communications to "fifth generation" (5G) systems. 5G offers promise of increased speed and ubiquity, but methodologies for processing 5G wireless communications have not yet been set.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known wireless communication components, circuits, control signals, timing protocols, computing system components, and software operations have not been shown in detail in order to avoid unnecessarily obscuring the described embodiments of the invention.

Embodiments disclosed herein may recognize that a single chip solution for processing communications signals provides reduced power consumption and a smaller physical footprint, which may make a single chip solution preferable in mobile and/or wireless systems, such as smartphones. Moreover, such single chip solutions may provide increased versatility by allowing for the dynamic allocation of processing elements to process communications signals. Such single chip solutions may also integrate traditional wireless communications bands (e.g., industrial, scientific, and medical radio band) with sub 1-GHz bands that many emerging Internet of Things (IoT) systems may utilize. Stated differently, the single chip solutions described herein are not limited to certain frequency bands like traditional systems (e.g., a smartphone being limited to 4G long-term evolution (LTE), WiFi, and/or Bluetooth®). Instead, examples of single-chip solutions described herein may integrate those communication technologies with transceivers for IoT systems, such as Z-Wave operating at 900 MHz; radio frequency identification (RFID) systems operating at any of 13.56 MHz, 433 MHz, or 902-928 MHz ranges; and/or even microwave frequencies at 3.1-10 GHz.

In various embodiments, a processing element with a reconfigurable fabric can be used to process different protocols, according to the demand of a wireless system or an IoT system. For example, hardware and power complexity may be reduced when utilizing the reconfigurable fabric space for baseband and digital front and processing for any type of analog processing system (e.g., different antennas for corresponding frequency bands). In contrast to conventional wireless transceivers and IoT reader systems, the processing capability of each of those receiver systems may be integrated into the reconfigurable fabric space that can be dynamically shifted for processing of signals from any analog processing system. In this shared reconfigurable fabric space application, processing for each receiver system may be allocated to a respective cluster(s) of processing elements. In such an embodiment, the aggregate processing results of each receiver system can be processed in the shared, coherent memory space, before deciding whether to transmit an aggregated processing result via a specific transmitter. For example, using a shared reconfigurable fabric, a processing result derived from measurements of an IoT system and information from an LTE system can be transmitted via an RFID system, in some examples, utilizing the same processing element.

Figure 1:
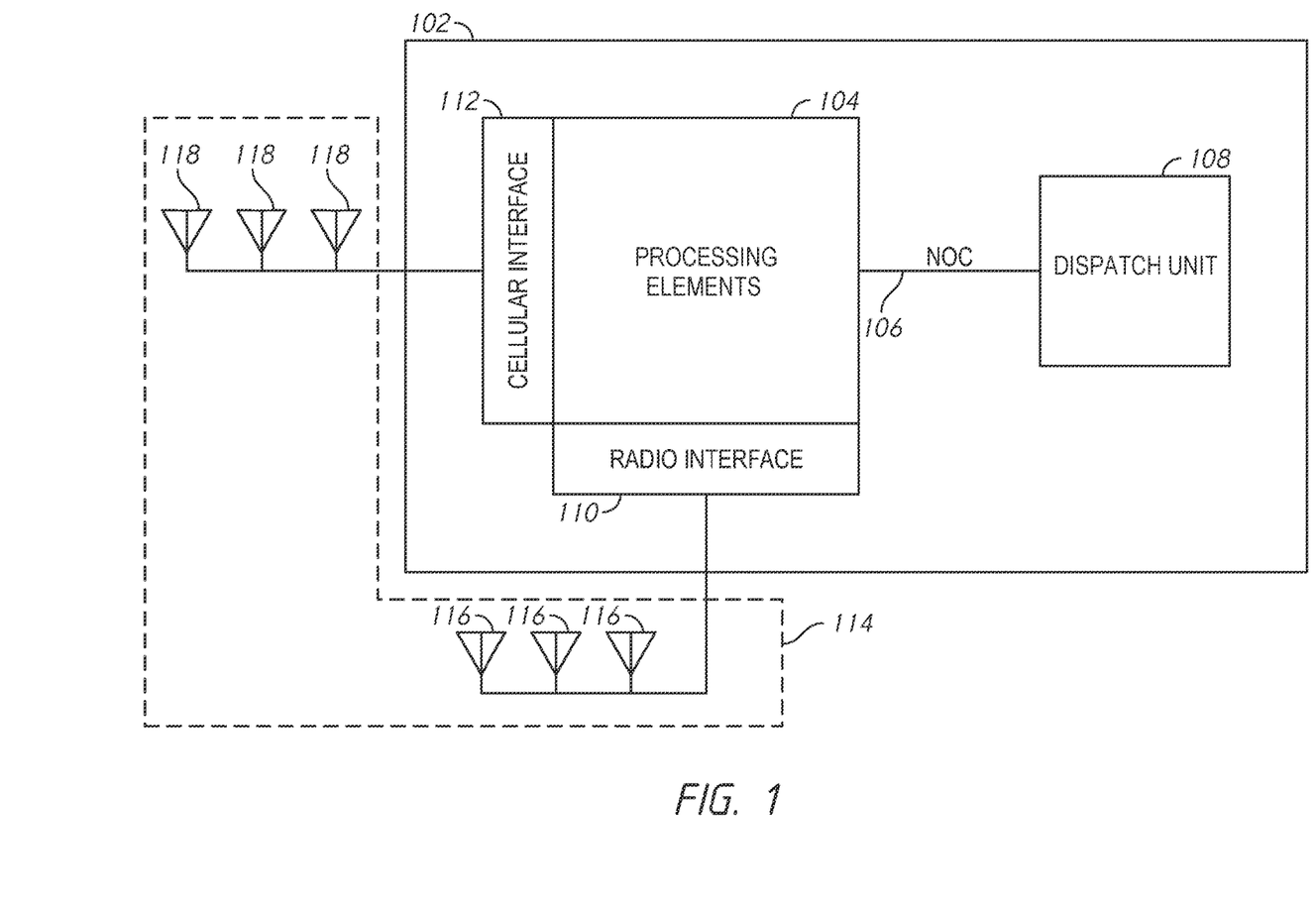
FIG. 1 is a block diagram of an integrated circuit chip, in accordance with an embodiment of the present invention.

FIG. 1 is a block diagram of an integrated circuit chip 102, in accordance with an embodiment of the present invention. The integrated circuit chip 102 is a single chip capable of processing communications signals. Examples of single chip systems include those where circuitry for performing the described tasks are fabricated on and/or into a common substrate generally using semiconductor fabrication techniques. The integrated circuit chip 102 includes a plurality of processing elements 104, a network on chip (NOC) 106, a dispatch unit 108, a radio interface 110, and a cellular interface 112. The integrated circuit chip 102 may be coupled to a plurality of antennas 114. The plurality of antennas 114 may include a first set of antennas 116 and a second set of antennas 118.

The processing elements 104 may be implemented using one or more processors, for example, having any number of cores. In some examples, the processing elements 104 may include circuitry, including custom circuitry, and/or firmware for performing functions described herein. For example, circuitry can include multiplication unit/accumulation units for performing the described functions, as described herein. Processing elements 104 can be any type including but not limited to a microprocessor or a digital signal processor (DSP), or any combination thereof. For example, processing elements 104 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof.

The NOC 106 may be implemented as an on-chip communications sub-system configured to facilitate communication between the processing elements 104 and the dispatch unit 108. The NOC 106 may include, for example, one or more links, such as copper wires, connecting the processing elements 104 and the dispatch unit 108 and configured to carry information from the processing elements 104 to the dispatch unit 108 and vice versa.

The dispatch unit 108 may include instructions sets (e.g., one or more program instructions or operations) to be performed by the processing elements 104. The dispatch unit may include, for example, computer software, hardware, firmware, or a combination thereof configured to provide instruction sets from a storage device to the processing elements 104. For example, the instruction sets may include instructions to perform certain logic or arithmetic operations on data, transmit data from one processing element 104 to another processing element 104, or perform other operations. In some embodiments, a first processing element instruction set 108 may be loaded onto a first processing element 104 and include instructions for a processing element to receive a signal of a first type (e.g., a signal associated with a received radio signal), to process the received signal of a first type to generate a set of data, and to transmit the set of data to a second processing element 104. A second processing element instruction set 108 may be loaded onto a second processing element 104 and be configured to receive the set of data, process the set of data to generate a second signal of a second type and to transmit the second signal with a plurality of antennas. The dispatch unit 108 may retrieve instructions for the processing elements 104 from one or more memories, such as a volatile (e.g., dynamic random access memory (DRAM)) or non-volatile memory (e.g., Flash memory). The processing element instruction sets may be stored in one or more data structures, such as a database.

The radio interface 110 may be coupled to the plurality of antennas 114 and to one or more of the processing elements 104. The radio interface 110 may be configured to receive radio signals detected by the plurality of antennas 114 and convert the received signals into a signal that can be manipulated by the one or more processing elements 104 and route the resulting signal to the one or more processing elements. In some embodiments, radio interface 110 may include an analog to digital converter. In other embodiments, the radio interface 110 may include additional or different components, circuits, etc. Although described as a "radio interface," in some examples, the interface may generally be adapted to convert a received signal of any type to a signal that can be manipulated by the processing elements 104. For example, the radio interface 110 may be configured to receive Wi-Fi signals, optical signals, auditory signals, or any other type of signals. In some embodiments, the radio interface 110 is configured to receive RFID signals detected by the plurality of antennas 114 and to provide the received signals to the one or more processing elements 104.

The cellular interface 112 may be coupled to the plurality of antennas 114 and to one or more of the processing elements 104. The cellular interface 112 may be configured to transmit/receive cellular signals with the plurality of antennas 114 and convert the signals between a signal that can be manipulated by the one or more processing elements 104 and a signal that can be transmitted using the plurality of antennas 114. In some embodiments, cellular interface 112 may include a digital to analog converter. In other embodiments, the cellular interface 112 may include additional or different components, circuits, etc. Although described as a "cellular interface," in some examples, the interface may generally be adapted to any type of signal. A cellular signal may generally refer to any protocol of cellular signal, such as 3G, 4G, 4G LTE, 5G, etc. The cellular interface 112 may be configured to transmit Wi-Fi signals, optical signals, auditory signals, or any other type of signals. In some embodiments, the cellular interface 112 is configured to transmit a different type of signal than the radio interface 110.

The plurality of antennas 114 is configured to receive and transmit wireless signals. The plurality of antennas 114 may generally be any type of antennas, such as a wire antenna (e.g., a dipole antenna, a loop antenna, a monopole antenna, a helix antenna, etc.), an aperture antenna (e.g., a waveguide, a horn antenna, etc.), a reflector antenna (e.g., a parabolic reflector, a corner reflector, etc.), a lens antenna (e.g., a convex-plane, a concave-plane, a convex-convex, or a concave-concave), a microstrip antenna (e.g., a circular shaped, rectangular shaped, metallic patch, etc.), an array antenna (e.g., a Yagi-Uda antenna, a micro strip patch array, an aperture array, a slotted wave guide array, etc.), or combinations thereof.

In the embodiment of FIG. 1, the plurality of antennas 114 includes a first subset of antennas 116 configured to receive radio signals and to communicate the received signals to the radio interface 110. The plurality of antennas 114 further includes a second subset of antennas 118 configured to communicate over a cellular network. The second subset of antennas 118 may receive signals from the cellular interface 112 and transmit the received signals to one or more cellular nodes (not shown), such as a cellular tower. In various embodiments, the plurality of antennas 114 may be configurable. For example, antennas in the plurality of antennas 114 may be adjustable to receive and/or transmit signals of different types. In such embodiments, the first subset of antennas 116 and the second subset of antennas 118 may be the same antennas. For example, the first subset of antennas 116 may be configured to receive radio signals, such as an RFID signal and to communicate the received radio signal to the processing elements 104 via the radio interface 110. The first subset of antennas 116 may be reconfigured to communicate using a cellular network as the second subset of antennas 118. For example, the plurality of antennas 118 may include or be coupled to an integrated inner mechanism, such as RF switches, varactors, mechanical actuators, or tunable materials, that enable the intentional redistribution of currents over the surface of the antenna to produce modifications of its properties. The processing elements 104 may process the received radio signals according to the instruction sets fetched by the dispatch unit 108 and communicate a resulting cellular signal to the second subset of antennas 118 via the cellular interface 112. The second subset of antennas 118 may then communicate the received signals via a cellular network.

Figure 2:
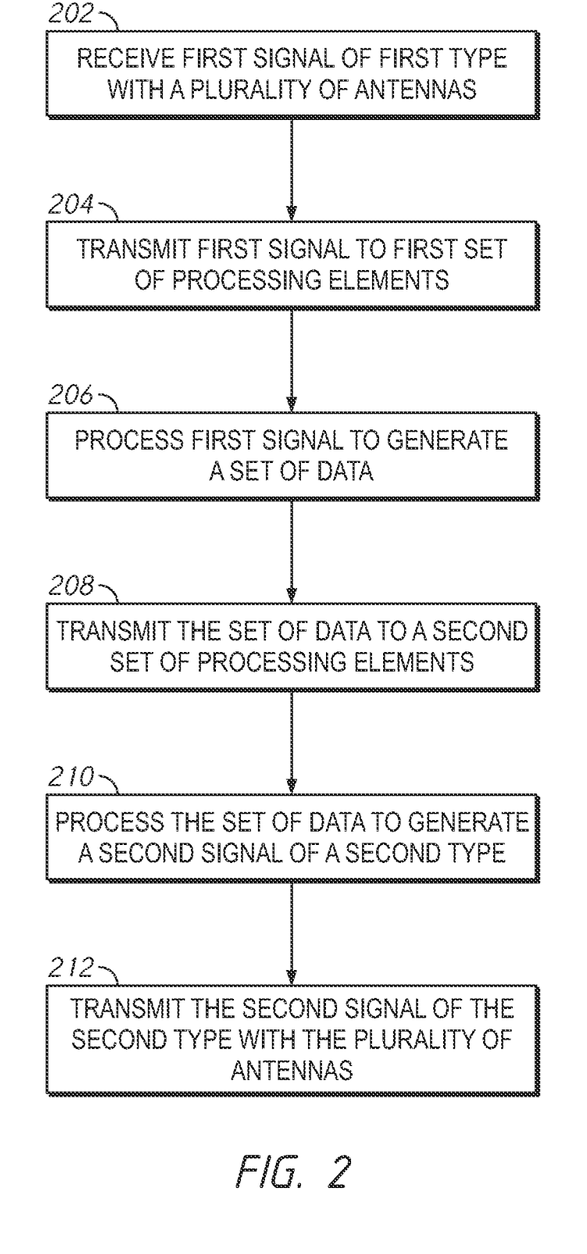
FIG. 2 is a flowchart illustrating a method of processing signals with a single integrated circuit chip, in accordance with an embodiment of the present invention.

FIG. 2 is a flowchart illustrating a method of processing signals with a single integrated circuit chip, in accordance with an embodiment of the present invention.

In operation 202, a first signal of a first type is received with a plurality of antennas. The signal may be received, for example, with the plurality of antennas 114, and specifically with the first subset of antennas 116. In various embodiments, the first signal of the first type may be a radio signal associated with an RFID device. The first subset of antennas 114 may employ beam forming to detect one or more first signals of the first type. Beamforming is a signal processing technique that enables directional signal transmission or reception. Beamforming typically uses a phased antenna array in such a way that signals at particular angles experience constructive interference while signals at other angles experience destructive interference.

In operation 204, the first signal of the first type is provided to a first set of processing elements. For example, the first subset of antennas 116 may provide the received first signal of the first type to one or more of the processing elements 104 via the radio interface 110. The particular processing element(s) 104 to which the first signal of the first type is provided may be determined, for example, by the instructions sets provided by the dispatch unit 108.

In operation 206, the first signal of the first type is processed to generate a set of data. For example, the one or more processing elements 104 may process the received first signal to generate a particular set of data. The set of data may generally be any type of data. For example, the set of data may include location information for one or more devices that transmitted the first signal of the first type. In one embodiment, an RFID device emits a radio signal. The radio signal is detected by the first subset of antennas 116. The one or more processing elements 104 may process the received signals based on known beamforming or interferometry properties of the first subset of antennas 116 to derive location information about the one or more RFID devices.

In operation 208, the set of data may be transmitted to a second set of processing elements. For example, the first set of processing elements 104 may transmit the set of data to a second set of processing elements 104. The particular processing elements 104 included in the second set may be identified by the processing element instruction set(s) 108 being executed by the first set of processing elements 104. For example, the processing element instruction set 108 may include address information for the second set of processing elements 104. Once the first set of processing elements 104 generates the set of data, the processing element instruction set 108 may instruct the first set of processing elements 104 to transmit the set of data to a switch. The switch may then transmit the set of data to the second set of processing elements 104.

In operation 210, the set of data may be processed to generate a second signal of a second type. For example, the set of data may be formatted for transmission according to a communications protocol corresponding to the second type of signal. The communications protocol may be, for example, a cellular communications protocol, such as 3G, 4G, or 5G. In other embodiments, the communications protocol may be Wi-Fi, Bluetooth®, or any other type of communication protocol.

In operation 212, the second signal of the second type is transmitted with the plurality of antennas. For example, the second set of processing elements 104 may transmit the second signal of the second type to the plurality of antennas 114 and specifically to the second subset of antennas 114 via the cellular interface 112. The second subset of antennas 118 may transmit the second signal of the second type to a cellular tower for example, or in the case of Wi-Fi, to a Wi-Fi node, such as a router.

Figure 3:
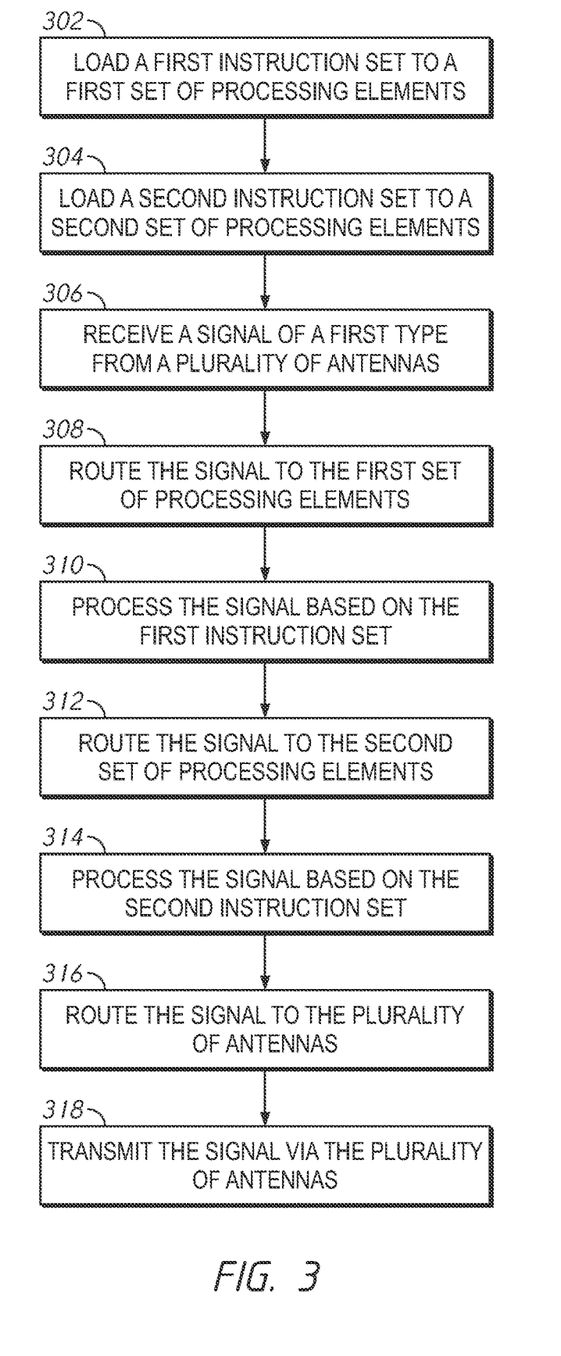
FIG. 3 is a flow chart illustrating a method of processing signals with a single integrated circuit chip, in accordance with an embodiment of the present invention.

FIG. 3 is a flow chart illustrating a method of processing signals with a single integrated circuit chip, in accordance with an embodiment of the present invention.

In operation 302, a first instruction set is loaded to a first set of processing elements. For example, an instruction set of the processing elements loaded by the dispatch unit 108 may be transferred to a first set of processing elements 104 via the NOC 106. The first set of processing elements 104 may process data according to the received first instruction set.

In operation 304, a second instruction set is loaded to a second set of processing elements. For example, an instruction set of the processing elements 104 loaded by the dispatch unit 108 may be transferred to a second set of the processing elements 104, different from the first set of processing elements 104 in operation 302, via the NOC 106. The second set of processing elements 104 may process data according to the received second instruction set. The second instruction set may generally include any types of instructions. In one embodiment, the second instruction set includes instructions to convert received signals from a first format (e.g., signal type or communications protocol) to a second format. For example, the second instruction set may include instructions to convert a signal from an RFID format to a format that can be communicated via cellular or WiFi network.

In operation 306, a signal of a first type is received from a plurality of antennas. For example, the plurality of antennas 114 may detect one or more signals of a first type, such as a radio frequency signal (e.g., and RFID signal). In one embodiment, the signal of the first type may be received by the first set of antennas 116.

In operation 308, the signal of the first type is routed to the first set of processing elements. For example, the plurality of antennas 114 may transfer the received signal of the first type to the radio interface 110. The radio interface 110 may transfer the signal of the first type to the first set of processing elements. As discussed above, the radio interface 110 may include various circuits, such as analog to digital converters, etc.

In operation 310, the signal of the first type is processed based on the first instruction set. For example, the first set of processing elements 104, into which the first instruction sets were loaded in operation 302, may process the received signal of the first type in accordance with the first instruction set. For example, the first instruction set may include processing instructions to determine a location of one or more sources of the signals of the first type. However, those skilled in the art will appreciate that any series of instructions may be executed by the first set of processing elements 104.

In operation 312, the processed signal is routed to a second set of processing elements. For example, the first instruction set loaded into the first set of processing elements 104 may include instructions to transfer the processed signal of the first type to the second set of processing elements 104 into which the second instruction set was loaded in operation 304. Specifically, the first set of processing elements 104 may transfer the processed signal to one or more switches along with an instruction to transmit the signal to the particular processing elements 104 executing the second instruction set. The one or more switches may then transfer the processed signal to the second set of processing elements 104.

In operation 314, the signal is processed based on the second instruction set. For example, the second set of processing elements 104, into which the second instruction set was loaded in operation 304, may process signals received in operation 312 to generate signals of a second type. As a specific example, the second set of processing elements may convert received signals into a format that can be transmitted via a cellular network or a WiFi network. Such processing may include, for example, converting the received signals into data packets of information for transmission.

In operation 316, the signal is routed to the plurality of antennas. For example, the second set of processing elements 104 may transmit the processed signal to the cellular interface 112. As discussed above, the cellular interface 112 may include various circuits, such as an analog to digital converter. The cellular interface 112 may provide the signal of the second type to the plurality of antennas 114. In a specific example, the cellular interface 112 may provide the signal of the second type to the second set of antennas 118. In various embodiments, the second set of antennas 118 may be the same antennas as the first set of antennas 116 on which the signal of the first type was received in operation 306.

In operation 318, the signal of the second type is transmitted via the plurality of antennas.

Figure 4:
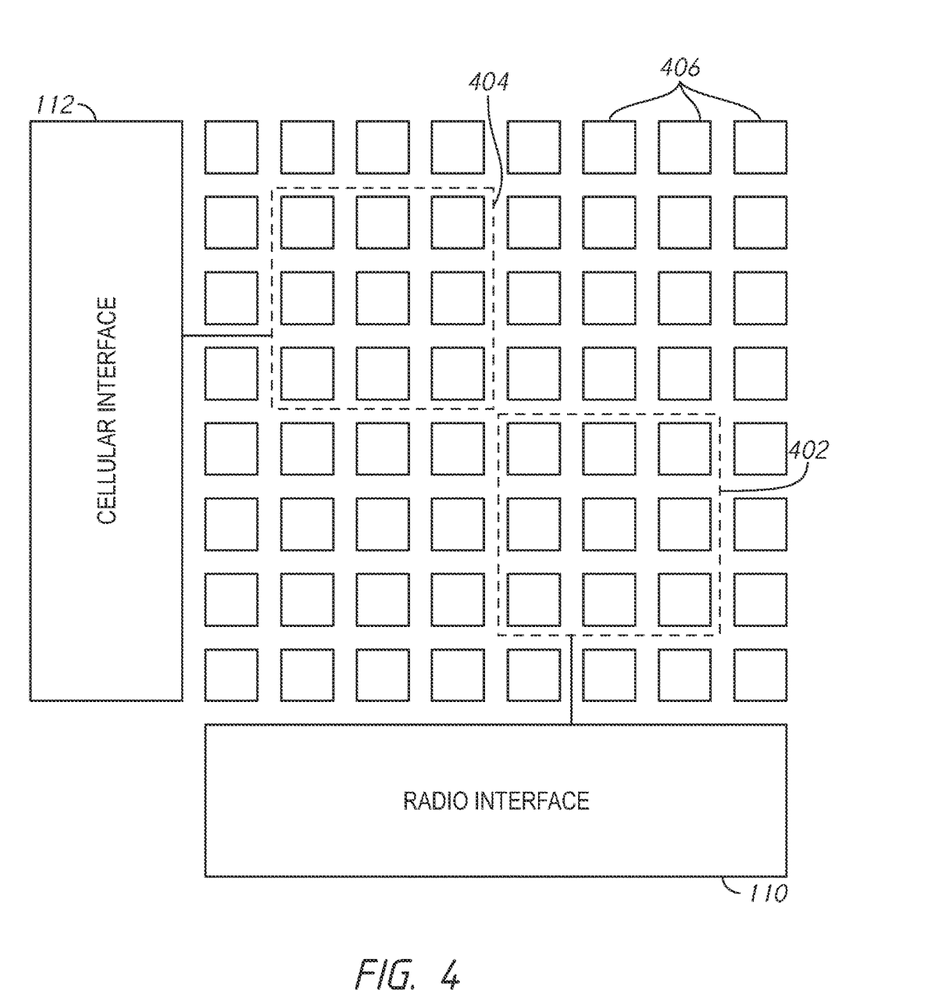
FIG. 4 is a block diagram of plurality of processing elements and communication interfaces, in accordance with an embodiment of the present invention.

FIG. 4 is a block diagram of plurality of clusters 406 processing elements 104, a radio interface 110, and a cellular interface 112, in accordance with an embodiment of the present invention. The clusters 406 of processing elements 104, the radio interface 110, and the cellular interface 112 may be implemented as described above with respect to FIG. 1. As shown in FIG. 4, some of the clusters 406 may be grouped into one or more sets. For example, a first number of clusters 406 may be grouped into a first set 402 and a second number of clusters 406 may be grouped into a second set 404. Each of the clusters 406 in the first set 402 may be coupled to the radio interface 110, and the radio interface may route received signals to the clusters 406 in the first set 402. Each of the processing elements 104 in the clusters 406 may have a first instruction set loaded thereon and may process signals received from the radio interface 110 according to the first instruction set. The clusters 406 of the first set 402 may transmit processed signals to the clusters 406 of the second set 404 via one or more switches. Each of the processing elements 104 of the clusters 406 of the second set 404 may have a second instruction set loaded thereon and process the received signals according to the second instruction set to generate signals of a second type. The clusters 406 of the second set 404 may be coupled to the cellular interface 112 and may transfer the signals of the second type to the cellular interface 112 to be transmitted via a plurality of antennas (not shown).

Although each of the first set 402 and the second set 404 are shown as including nine clusters 406, greater or fewer clusters 406 may be dynamically added or subtracted from the first set 402 and/or the second set 404 based on system demands or signaling volumes. For example, if the number of radio signals received by the antennas and transmitted to the radio interface 110 increases, additional clusters 406 may be added to the first set 402 to handle the increased processing load.

Figure 5:
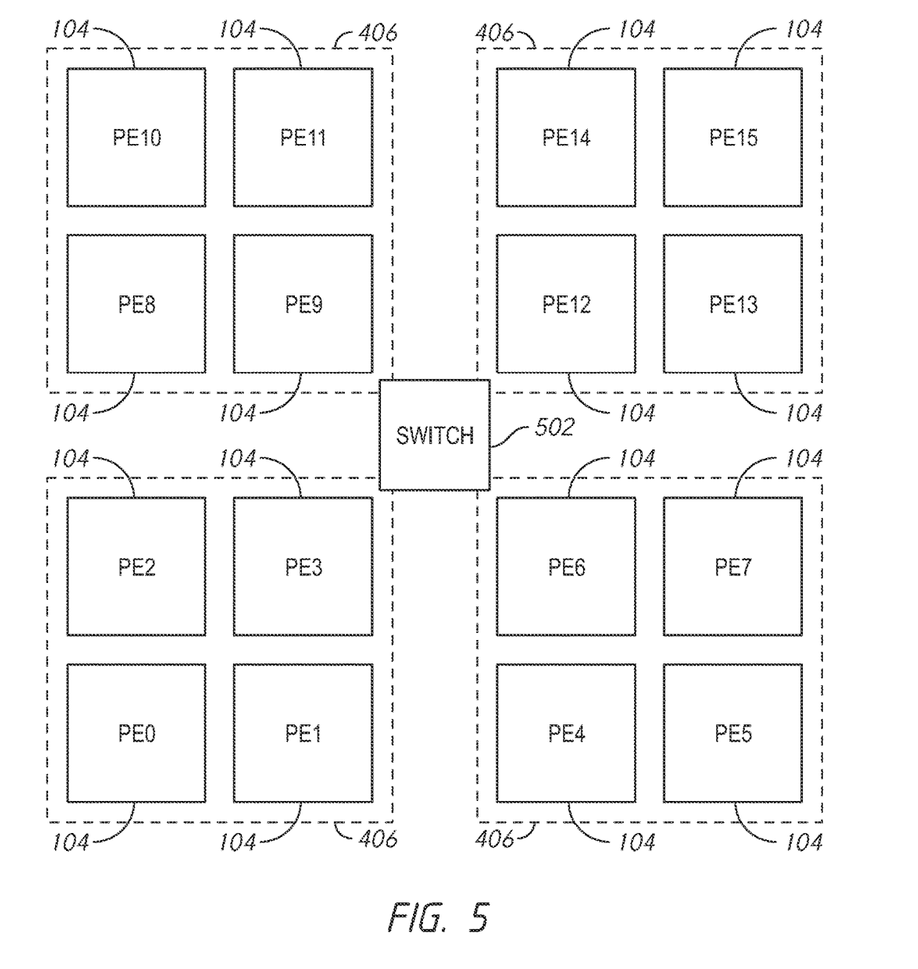
FIG. 5 is a block diagram of a plurality of processing elements, in accordance with an embodiment of the present invention.

FIG. 5 is a block diagram of a plurality of clusters 406 coupled through a switch 502, in accordance with an embodiment of the present invention. In the embodiment of FIG. 5, each cluster 406 includes four processing elements 104. Each processing element 104 of a given cluster 406 may communicate directly with another processing element 104 within that same cluster 406. For example, each of the processing elements PE0-3 can directly communicate with one another. Similarly, processing elements PE4-7 can communicate directly, as can processing elements PE8-11 and PE12-15. Processing elements 104 of different clusters 406 may communicate with one another via a switch 502 based on instructions in whatever instruction set is loaded for a given processing element 104. For example, the processing element PE14 may transmit a signal to the switch 502 with an instruction that the signal should be routed to the processing element PE1. The switch may route the signal directly to the processing element PE1 or the switch may route the signal to another processing element in the same cluster as PE1 (i.e., processing elements PE0, PE2, or PE3), which then route the received signal to processing element PE1. By linking clusters of processing elements together in this manner, greater or fewer clusters 406 may be added simply by changing the instruction sets that are loaded for a set of processing elements.

Figure 6:
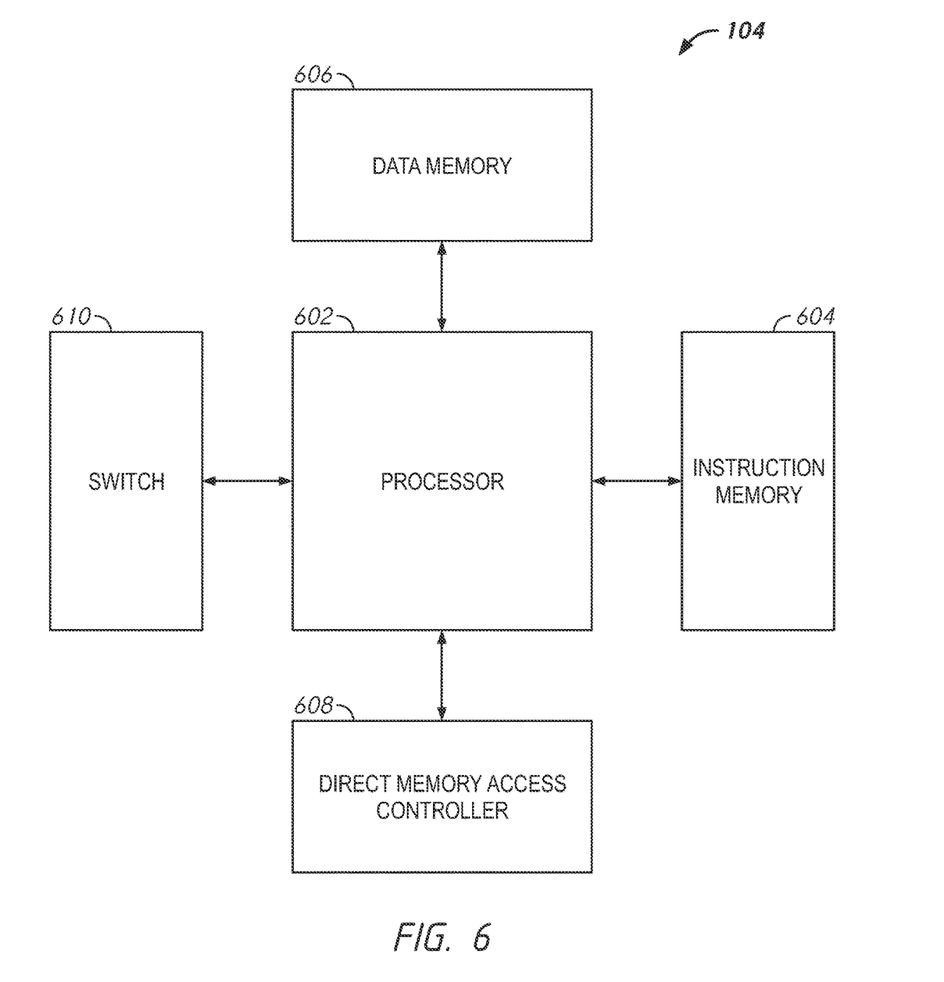
FIG. 6 is a block diagram of a processing element, in accordance with an embodiment of the present invention.

FIG. 6 is a block diagram of a processing element 104, in accordance with an embodiment of the present invention. The processing element 104 generally includes a processor 602 coupled to an instruction memory 604, a data memory 606, a direct memory access controller 608, and a switch 610.

The processor 602 may include, for example, a number of processing cores. In some examples, the processor 602 may include circuitry, including custom circuitry, and/or firmware for performing functions described herein. For example, circuitry can include multiplication units/accumulation units for performing operations described herein. The processor 602 may be, for example, a microprocessor or a digital signal processor (DSP), or any combination thereof. An example processor core can include an arithmetic logic unit (ALU), a bit manipulation unit, a multiplication unit, an accumulation unit, an adder unit, a look-up table unit, a memory look-up unit, or any combination thereof. The instruction memory 604 is a memory device configured to store a processing element instruction set 108. The instruction memory 604 may generally be any type of memory. For example, the instruction memory 604 may be a volatile memory, such as dynamic random access memory, or non-volatile memory, such as flash memory. The data memory 606 is a memory device configured to store received data, such as the data included in the signals received and/or transmitted from the plurality of antennas 114. The data memory 606 may generally be any type of memory. For example, the data memory 606 may be a volatile memory, such as dynamic random access memory, or non-volatile memory, such as flash memory. The direct memory access controller includes control circuitry for the processor 602 to access the instruction memory 604 and the data memory 606. The switch 610 routes data from one processing element 104 to another processing element 104. For example, the switch 610 may route data from one processing element 104 to another processing element 104 within a single cluster 406. The switch may generally be any type of switching fabric.

In operation, a processing element instruction set 108 may be loaded into and stored in the instruction memory 604. Data in the form of the received signals are stored in the data memory 606. The processor 602 processes the data in the data memory 606 in accordance with the processing element instruction set 108 stored in the instruction memory 604. For example, the processor 602 may perform arithmetic operations, convert the data from one format to another, or perform any other type of operations. The direct memory access controller 608 may control access of the processor 602 to the instruction memory 604 and/or the data memory 606. The processor 602 may transfer processed data to one or more other processing elements 104 via the switch 610.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application, but such implementation decisions should not be interpreted as causing a departure from the scope of the present disclosure.

What is claimed is:

1. An apparatus comprising:
   a plurality of antennas; and
   an integrated circuit chip coupled to the plurality of antennas, and configured to process cellular signals received from the plurality of antennas in accordance with a cellular communication protocol and to process radio frequency identification (RFID) signals received from the plurality of antennas in accordance with an RFID protocol;
   wherein the integrated circuit chip comprises:
   a first cluster of processing elements configured to process the cellular signals to be transmitted to another apparatus;
   a second cluster of processing elements configured to process the RFID signals; and
   a plurality of switches configured to route processed data from the first cluster of processing elements to the second cluster of processing elements, from the second cluster of processing elements to the first cluster of processing elements, or both,
   wherein a first switch of the plurality of switches is configured to route a portion of the processed data from a portion of processing elements of the first cluster of processing elements to the second cluster of processing elements, wherein a second switch of the plurality of switches is configured to route an additional portion of the processed data from an additional portion of the processing elements of the first cluster of processing elements to the second cluster of processing elements, and wherein a number of the processing elements of the first cluster is dynamically configurable to include the additional portion of the processing elements from the second cluster of the processing elements based on an increased processing load at the first cluster of processing elements.

2. The apparatus of claim 1, wherein one or more first antennas of the plurality of antennas are configured to receive the cellular signals.

3. The apparatus of claim 1, wherein one or more second antennas of the plurality of antennas are configured to receive the RFID signals.

4. The apparatus of claim 1, wherein the integrated circuit chip is configured to process the cellular signals and the RFID signals at least partially simultaneously.

5. The apparatus of claim 1, wherein the integrated circuit chip further comprises a network on chip.

6. An apparatus comprising:
   a plurality of antennas;
   an integrated circuit chip coupled to the plurality of antennas, the integrated circuit chip comprising:
   a first cluster of processing elements comprising:
   a first plurality of processing elements configured to process RFID information received with the plurality of antennas; and
   a second plurality of processing elements configured to process the RFID information; and
   a second cluster of processing elements comprising:
   a third plurality of processing elements configured to process cellular data received with the plurality of antennas; and
   a plurality of switches configured to route processed data from the first cluster of processing elements to the second cluster of processing elements, from the second cluster of processing elements to the first cluster of processing elements, or both,
   wherein a number of the second cluster of processing elements are dynamically configurable to include a portion of the second plurality of processing elements based on a processing load increase to an amount of the cellular data received with the plurality of antennas, and wherein the second cluster of processing elements further comprises the portion of the second plurality of processing elements based on the number of the second cluster of processing elements dynamically configurable to include the portion of the second plurality of processing elements.

7. The apparatus of claim 6, wherein the integrated circuit chip further comprises an RFID interface configured to couple the plurality of antennas to the first cluster of processing elements.

8. The apparatus of claim 6, wherein the integrated circuit chip further comprises a cellular interface configured to couple the plurality of antennas to the second cluster of processing elements.

9. The apparatus of claim 6, wherein the integrated circuit chip further comprises a plurality of switches configured to communicate data among the first cluster of processing elements and the second cluster of processing elements.

10. The apparatus of claim 6, wherein the integrated circuit chip further comprises a respective data memory coupled to each processing element of the first, second, and third pluralities of processing elements, and wherein the respective data memories of the first cluster of processing elements are configured to store the received RFID information and the respective data memories of the second cluster of processing elements are configured to store the cellular data.

11. A method comprising:
   receiving a first signal of a first type via a plurality of antennas;
   processing, by a first plurality of processing elements of an integrated circuit chip, the first signal to generate a set of data;
   transferring, by a switch, the set of data to a second plurality of processing elements of the integrated circuit chip;
   dynamically adding a portion of the first plurality of processing elements to the second plurality of processing elements based partly on the set of data indicative of a processing load increase to an amount of data processed by the second plurality of processing elements;

processing, by the second plurality of processing elements including the portion of the first plurality of processing elements, the set of data to generate a second signal of a second type; and transmitting, by the plurality of antennas, the second signal.

12. The method of claim 11, wherein the first signal of the first type is a radio frequency identification signal.

13. The method of claim 11, wherein the second signal of the second type is a cellular signal.

14. The method of claim 11, wherein processing the set of data to generate the second signal of the second type comprises generating a data packet according to a protocol associated with the second type of signal.

15. The method of claim 11, further comprising loading an instruction set to a memory on the integrated circuit chip associated with the first plurality of processing elements, wherein the instructions set comprises instructions for processing the first signal to generate the set of data.

16. The method of claim 11, further comprising loading an instruction set to a memory on the integrated circuit chip associated with the second plurality of processing elements, wherein the instruction set comprises instructions for processing the set of data to generate the second signal.

17. The method of claim 11, further comprising:

receiving a third signal of the first type via the plurality of antennas; and processing, by the first plurality of processing elements of the integrated circuit chip, the third signal to generate a second set of data, wherein the first plurality of processing elements processes the third signal in parallel with the second plurality of processing elements processing the set of data.

18. An apparatus comprising:
a plurality of antennas;
an integrated circuit chip coupled to the plurality of antennas, the integrated circuit chip comprising:
a first cluster of processing elements comprising:
a first plurality of processing elements configured to process RFID information received with the plurality of antennas; and
a second plurality of processing elements configured to process the RFID information; and
a second cluster of processing elements comprising:
a third plurality of processing elements configured to process cellular data received with the plurality of antennas; and
a plurality of switches configured to route processed data from the first cluster of processing elements to the second cluster of processing elements, from the second cluster of processing elements to the first cluster of processing elements, or both, wherein a number of the second cluster of processing elements is dynamically configurable to include a portion of the second plurality of processing elements based on a processing load increase to an amount of the cellular data received with the plurality of antennas, wherein the second cluster of processing elements further comprises the portion of the second plurality of processing elements based on the number of the second cluster of processing elements dynamically configurable to include the portion of the second plurality of processing elements, and wherein the integrated circuit chip further comprises a switch configured to communicate data from the first cluster of processing elements to the second cluster of processing elements.

* * * * *